US012618133B2

(12) United States Patent
Li et al.

(10) Patent No.: US 12,618,133 B2
(45) Date of Patent: May 5, 2026

(54) DIGITAL AND INFORMATIONIZED FULLY-AUTOMATIC ALUMINUM THERMAL-SPRAYING PRODUCTION LINE

(71) Applicant: GUIZHOU POWER GRID CO., LTD, Guiyang (CN)

(72) Inventors: Bo Li, Guiyang (CN); Jie Bai, Guiyang (CN); Yongliang Yi, Guiyang (CN); Hongtao Liu, Guiyang (CN); Zhiqing Zhang, Guiyang (CN); Zhen Tan, Guiyang (CN); Shifeng Liu, Guiyang (CN); Xiujing Wang, Guiyang (CN); Dan Yang, Guiyang (CN); Chun Shao, Guiyang (CN); Yu Wu, Guiyang (CN); Jingfeng Li, Guiyang (CN)

(73) Assignee: GUIZHOU POWER GRID CO., LTD, Guiyang (CN)

( * ) Notice: Subject to any disclaimer, the term of this patent is extended or adjusted under 35 U.S.C. 154(b) by 434 days.

(21) Appl. No.: 18/259,782

(22) PCT Filed: Apr. 19, 2022

(86) PCT No.: PCT/CN2022/087549
§ 371 (c)(1),
(2) Date: Jun. 29, 2023

(87) PCT Pub. No.: WO2023/092932
PCT Pub. Date: Jun. 1, 2023

(65) Prior Publication Data

US 2024/0060167 A1 Feb. 22, 2024

(30) Foreign Application Priority Data

Nov. 23, 2021 (CN) ........................ 202111395090.5

(51) Int. Cl.
*C23C 4/131* (2016.01)
*B08B 7/00* (2006.01)
(Continued)

(52) U.S. Cl.
CPC ............ *C23C 4/131* (2016.01); *B08B 7/0042* (2013.01); *C23C 4/02* (2013.01); *C23C 4/08* (2013.01); *C23C 4/18* (2013.01)

(58) Field of Classification Search
None
See application file for complete search history.

(56) References Cited

U.S. PATENT DOCUMENTS 7,682,667 B2 * 3/2010 Imaizumi .................. C23C 4/12 427/455
8,628,860 B2 * 1/2014 Refke ....................... C23C 4/14 428/632
(Continued)

FOREIGN PATENT DOCUMENTS

CN 105689175 A 6/2016
CN 106350761 A 1/2017
(Continued)

*Primary Examiner* — Jethro M. Pence
(74) *Attorney, Agent, or Firm* — Bayramoglu Law Offices LLC

(57) ABSTRACT

A digital and informationized fully-automatic aluminum thermal-spraying production line includes: an automatic feeding system including first transfer mechanisms and first carrying conveying mechanisms; a laser cleaning system including a laser cleaning tank, laser cleaning nozzles and cleaning conveying mechanisms; a first transfer system including second carrying conveying mechanisms and second transfer mechanisms; an aluminum thermal-spraying system including traveling mechanisms, turning mechanisms and an aluminum spraying mechanism, the traveling mechanisms being configured to convey workpieces on the second carrying conveying mechanisms onto the turning
(Continued)

mechanisms one-by-one, the turning mechanisms being configured to turn the workpieces by a preset angle, and the aluminum spraying mechanism being configured to perform aluminum arc-spraying on the workpieces. The fully-automatic aluminum thermal-spraying production line greatly improves the cleaning and aluminum spraying efficiency of angle steel/flat steel, reduces the production cost, and has good economic benefits.

10 Claims, 9 Drawing Sheets

(51) Int. Cl.

| | |
|---|---|
| ***C23C 4/02*** | (2006.01) |
| ***C23C 4/08*** | (2016.01) |
| ***C23C 4/18*** | (2006.01) |

(56) References Cited

U.S. PATENT DOCUMENTS

| | | | | |
|---|---|---|---|---|
| 9,562,281 | B2 * | 2/2017 | Refke | C23C 24/04 |
| 10,682,847 | B2 * | 6/2020 | Guixeras Nogue | B41F 35/001 |
| 11,738,374 | B2 * | 8/2023 | Guo | B23K 26/36<br>134/1 |
| 2005/0170099 | A1 * | 8/2005 | Gadow | C23C 4/16<br>427/446 |
| 2015/0202713 | A1 * | 7/2015 | Yanaka | B23K 26/032<br>219/76.14 |
| 2023/0038157 | A1 * | 2/2023 | Gao | B08B 7/0042 |

FOREIGN PATENT DOCUMENTS

| | | | |
|---|---|---|---|
| CN | 107336944 | A | 11/2017 |
| CN | 208341004 | U | 1/2019 |
| CN | 110605200 | A | 12/2019 |
| CN | 110813933 | A | 2/2020 |
| CN | 112573193 | A | 3/2021 |
| CN | 114012510 | A | 2/2022 |
| CN | 114015966 | A | 2/2022 |
| CN | 114042700 | A | 2/2022 |
| CN | 114059004 | A | 2/2022 |
| CN | 114107875 | A | 3/2022 |
| DE | 102008001721 | A1 | 11/2009 |
| GB | 2473670 | A | 3/2011 |

* cited by examiner

DIGITAL AND INFORMATIONIZED FULLY-AUTOMATIC ALUMINUM THERMAL-SPRAYING PRODUCTION LINE

CROSS REFERENCE TO THE RELATED APPLICATIONS

This application is the national phase entry of International Application No. PCT/CN2022/087549, filed on Apr. 19, 2022, which is based upon and claims priority to Chinese Patent Application No. 202111395090.5, filed on Nov. 23, 2021, the entire contents of which are incorporated herein by reference.

TECHNICAL FIELD

The invention relates to a digital and informationized fully-automatic aluminum thermal-spraying production line, and belongs to the technical field of aluminum thermal-spraying of workpieces.

BACKGROUND

Power line towers are important facilities of transformer substations, and the high-speed development of national power leads to an increasing higher demand for power, which makes it of great importance to guarantee safe and reliable power supply. However, the fact that the towers are generally made of steel and exposed to corrosive damage of wind, sand, rain, snow and acid water all year round, so they may be severely rusted, causing great economic losses and severe waste of production resources. At present, mature corrosion prevention techniques for metal equipment include the method of spraying protective coatings, the method of adding corrosion inhibitors, and the sacrificial cathode protective method, among which the method of spraying protective coatings is the most widely used corrosion prevention technique because it is the most economical, convenient and effective method. However, dedusting and spraying are carried out manually at present, which greatly limits the treatment efficiency and makes the production cost high.

SUMMARY

In view of the above problems, the invention provides a digital and informationized fully-automatic aluminum thermal-spraying production line, which greatly improves the spraying quality and efficiency through automatic laser cleaning, aluminum arc-spraying and automatic rolling of workpieces, thus overcoming the defects in the prior art.

The technical solution of the invention is as follows: a digital and informationized fully-automatic aluminum thermal-spraying production line includes:

An automatic feeding system including first transfer mechanisms and first carrying conveying mechanisms, wherein the first transfer mechanisms are able to convey workpieces onto the first carrying transfer mechanisms one-by-one;

A laser cleaning system including a laser cleaning tank, laser cleaning nozzles and cleaning conveying mechanisms, wherein a cleaning hole is formed in the laser cleaning tank, the laser cleaning nozzles are disposed in the laser cleaning tank and face the cleaning hole, the cleaning conveying mechanisms are disposed on two sides of the laser cleaning tank, and one end of the cleaning conveying mechanisms is flush with the first carrying conveying mechanisms;

A first transfer system including second carrying conveying mechanisms and second transfer mechanisms, wherein the second carrying conveying mechanisms are flush with the other end of the cleaning conveying mechanisms, and the second transfer mechanisms are able to convey workpieces on the second carrying conveying mechanisms;

An aluminum thermal-spraying system including traveling mechanisms, turning mechanisms and an aluminum spraying mechanism, wherein the traveling mechanisms are able to convey the workpieces from the second carrying conveying mechanisms onto the turning mechanisms one-by-one, the turning mechanisms are able to turn the workpieces by a preset angle, and the aluminum spraying mechanism is able to perform aluminum arc-spraying on the workpieces;

A second transfer system including third carrying conveying mechanisms and third transfer mechanisms, wherein the third carrying conveying mechanisms are able to receive the workpieces conveyed from the traveling mechanisms, and the third transfer mechanisms are able to convey the workpieces on the third carrying conveying mechanisms one-by-one; and An automatic rolling system including rolling conveying mechanisms and rolling mechanisms, wherein the rolling conveying mechanisms are able to convey the workpieces on the third transfer mechanisms one-by-one, and the rolling mechanisms are able to roll the workpieces.

In one example, the digital and informationized fully-automatic aluminum thermal-spraying production line further includes:

A laser cutting system including a laser frame and a laser cutting head, wherein the laser frame is disposed behind the rolling mechanism, and the laser cutting head is disposed on the laser frame;

A third transfer mechanism including fourth carrying conveying mechanisms and fourth transfer mechanisms, wherein the fourth carrying conveying mechanisms are able to receive cut workpieces, and the fourth transfer mechanisms are able to convey the workpieces on the fourth carrying conveying mechanisms one-by-one; and A discharging and stacking system used for discharging the workpieces from the fourth carrying conveying mechanisms and stacking the workpieces.

In one example, the first transfer mechanisms, the second transfer mechanisms, the third transfer mechanisms and the fourth transfer mechanisms are identical in structure, and each include a transfer frame, a chain conveying mechanism and a transfer lifting mechanism, the chain conveying mechanism has an end hinged to the top of the transfer frame and an end hinged to the top of the transfer lifting mechanism;

The first carrying conveying mechanisms, the second carrying conveying mechanisms, the third carrying conveying mechanisms and the fourth carrying conveying mechanisms are identical in structure, and each include a carrying frame and conveying drive rollers, a plurality of carrying frames are disposed between the transfer frames at intervals, and the conveying drive rollers are rotatably disposed on the carrying frame.

In one example, at least four laser cleaning nozzles are regularly disposed around the cleaning hole at intervals.

In one example, each cleaning conveying mechanism includes a cleaning pedestal, rotary rollers, a pressing frame, a pressing drive mechanism, a pressing wheel carrier and a pressing wheel, the rotary rollers are rotatably disposed on the cleaning pedestal, the pressing frame is disposed on the cleaning pedestal, the pressing drive mechanism is disposed on the pressing frame, the pressing wheel carrier is disposed on the pressing drive mechanism, the pressing wheel is disposed on the pressing wheel carrier, and the pressing drive mechanism is able to drive the pressing wheel to move upwards and downwards.

In one example, the workpieces are angle steel, the pressing wheel includes a first pressing part and a second pressing part, the first pressing wheel and the second pressing wheel are both conical, and an angle matched with the angle steel is formed between the first pressing part and the second pressing part.

In one example, each traveling mechanism includes a traveling rail, a traveling trolley, a traveling lifting mechanism, a traveling pedestal and a traveling drive roller, the traveling trolley is able to move along the traveling rail, the traveling lifting mechanism is disposed on the traveling trolley, the traveling pedestal is disposed on the traveling lifting mechanism, the traveling drive roller is rotatably disposed on the traveling pedestal, and the traveling lifting mechanism is able to drive the traveling drive roller to move upwards and downwards;

Each said turning mechanism includes a turning frame, an arc-shaped sliding rail, an arc-shaped slider and a clamping assembly, the turning frames are disposed at one end of the traveling rails and are spaced from each other, the arc-shaped sliding rail is disposed on the turning frame, the arc-shaped slider is slidably disposed on the arc-shaped sliding rail, and the clamping assembly is disposed on the arc-shaped slider;

The aluminum spraying mechanism includes an aluminum spraying frame, a three-axis moving assembly, an angle adjustment assembly and a spray gun, the aluminum spraying frame is disposed on one side of the turning frames, the three-axis moving assembly is mounted on the aluminum spraying frame, and the spray gun is mounted on the three-axis moving assembly through the angle adjustment assembly.

In one example, an arc-shaped rack is disposed on the arc-shaped slider, and the arc-shaped rack is connected to a drive gear and is driven by the drive gear to move to drive the arc-shaped slider to move along the arc-shaped sliding rail.

In one example, each rolling mechanism includes a rolling pedestal, a rolling frame, at least two first rolling wheels, a rolling drive mechanism, a rolling wheel carrier and a second rolling wheel, the at least two first rolling wheels are rotatably disposed on the rolling pedestal and are spaced from each other, the rolling frame is disposed on the rolling pedestal, the rolling drive mechanism is disposed on the rolling frame, the rolling wheel carrier is mounted on the rolling drive mechanism, the second rolling wheel is rotatably mounted on the rolling wheel carrier, and the rolling drive mechanism is able to drive the second rolling wheel to move upwards and downwards.

In one example, the workpieces are angle steel, each first rolling wheel includes a first rolling part and a second rolling part, the first rolling part and the second rolling part are conical, and an angle matched with the angle steel is formed between the first rolling part and the second rolling part; and the second rolling wheel includes a third rolling part and a fourth rolling part, the third rolling part and the fourth rolling part are conical, and an angle matched with the angle steel is formed between the third rolling part and the fourth rolling part.

The invention has the following beneficial effects: the fully-automatic aluminum thermal-spraying production line of the invention provides a fully-automatic intelligent production scheme for automatic laser cleaning and automatic aluminum thermal-spraying of angle steel/flat steel, has the functions of automatic feeding, automatic conveying, automatic laser cleaning, automatic aluminum thermal-spraying, automatic cutting and automatic stacking, can be equipped with a production line intelligent control system such as a data-based intelligent manufacturing and information-based management and control platform, greatly improves the cleaning and aluminum spraying efficiency of angle steel/flat steel, reduces the production cost, and has good economic benefits.

DESCRIPTION OF REFERENCE SIGNS

1, automatic feeding system;

11, first transfer mechanism; 12, first carrying conveying mechanism;

111, transfer frame; 112, chain conveying mechanism; 113, transfer lifting mechanism;

121, carrying frame; 122, conveying drive roller;

2, laser cleaning system;

21, laser cleaning tank; 22, laser cleaning nozzle; 23, cleaning conveying mechanism; 24, cleaning hole; 25, dust outlet;

231, cleaning pedestal; 232, rotary roller; 233, pressing frame; 234, pressing drive mechanism; 235, pressing wheel carrier; 236, pressing wheel; 237, limit member;

2361, first pressing part; 2362, second pressing part;

3, first transfer system;
31, second carrying conveying mechanism; 32, second transfer mechanism;
4, aluminum thermal-spraying system;
41, traveling mechanism; 42, turning mechanism; 43, aluminum spraying mechanism;
411, traveling rail; 412, traveling trolley; 413, traveling lifting mechanism; 414, traveling pedestal; 415, traveling drive roller;
421, turning frame; 422, arc-shaped sliding rail; 423, arc-shaped slider; 424, clamping assembly;
4241, clamping cylinder; 4242, clamping member;
431, aluminum spraying frame; 432, three-axis moving assembly; 433, angle adjustment assembly; 434, spray gun;
4321, horizontal beam; 4322, sliding seat; 4323, vertical beam,
4331, arc-shaped sliding groove; 4332, arc-shaped sliding block; 4333, mounting base; 4334, drive motor;
5, second transfer system;
51, third carrying conveying mechanism; 52, third transfer mechanism;
6, automatic rolling system;
61, rolling conveying mechanism; 62, rolling mechanism;
611, rolling conveying stand; 612, rolling conveying drive mechanism; 613, rolling conveying roller;
621, rolling pedestal; 622, rolling frame; 623, first rolling wheel; 624, rolling drive mechanism; 625, rolling wheel carrier; 626, second rolling wheel;
6231, first rolling part; 6232, second rolling part;
6261, third rolling part; 6262, fourth rolling part;
7, laser cutting system;
71, laser frame; 72, laser cutting head;
8, third transfer system;
81, fourth carrying conveying mechanism; 82, fourth transfer mechanism;
9, discharging and stacking system;
91, discharging frame; 92, moving mechanism; 93, grabbing mechanism; 94, stacking frame; 95, discharging rail.

DETAILED DESCRIPTION OF THE EMBODIMENTS

To make the above purposes, features and advantages of the invention easily understood, the specific implementation of the invention will be described in detail below in conjunction with accompanying drawings. Many specific details are expounded in the following description to gain a full understanding of the invention. The invention can be implemented in many other ways different from those described here. Those skilled in the art can make similar improvements without departing from the contents of the invention, so the invention is not limited to the specific implementations disclosed below.

Figure 1:
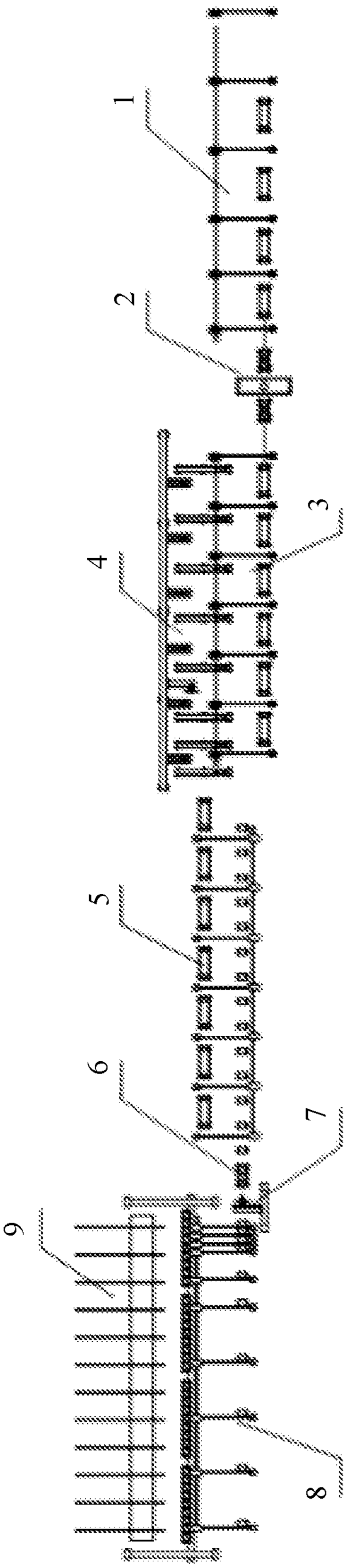
FIG. 1 is a process layout diagram of a fully-automatic aluminum thermal-spraying production line.
Figure 2:
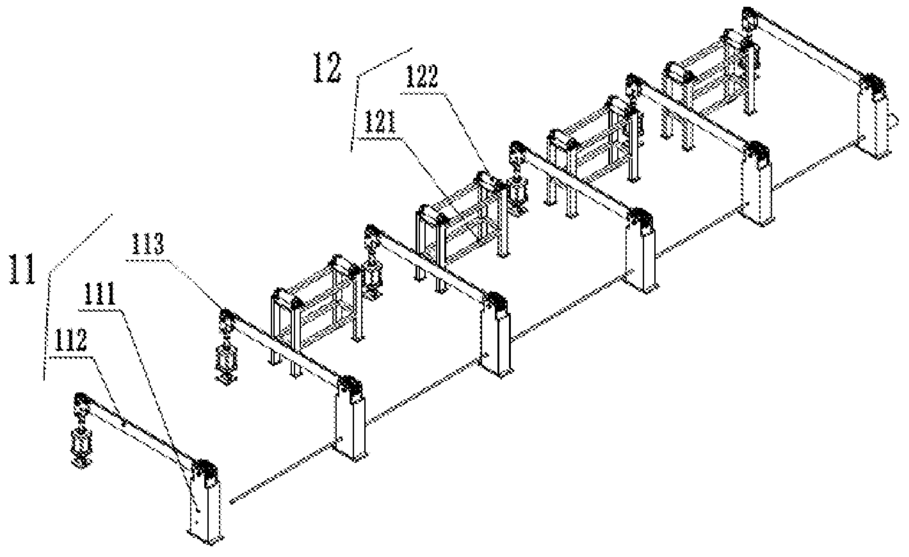
FIG. 2 is a schematic diagram of an automatic feeding system.
Figure 3:
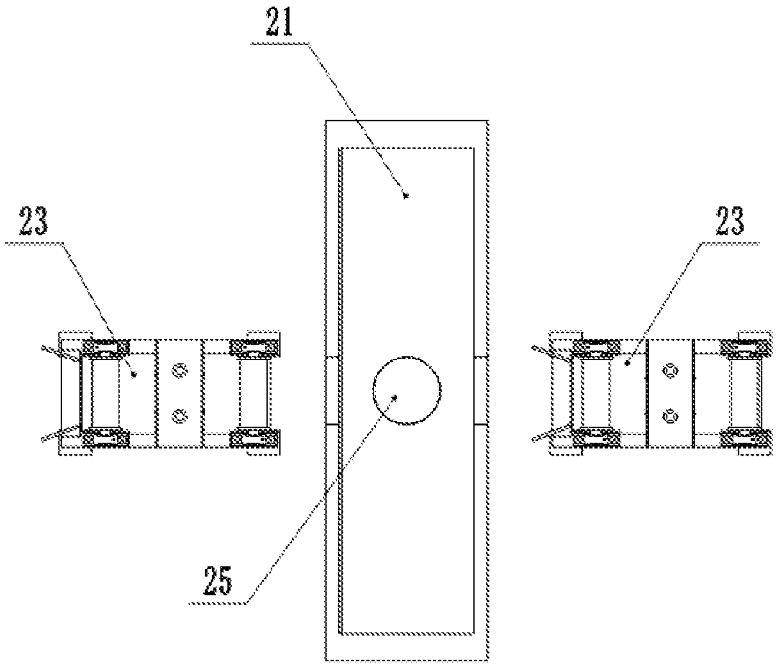
FIG. 3 is a schematic diagram of a laser cleaning system.
Figure 4:
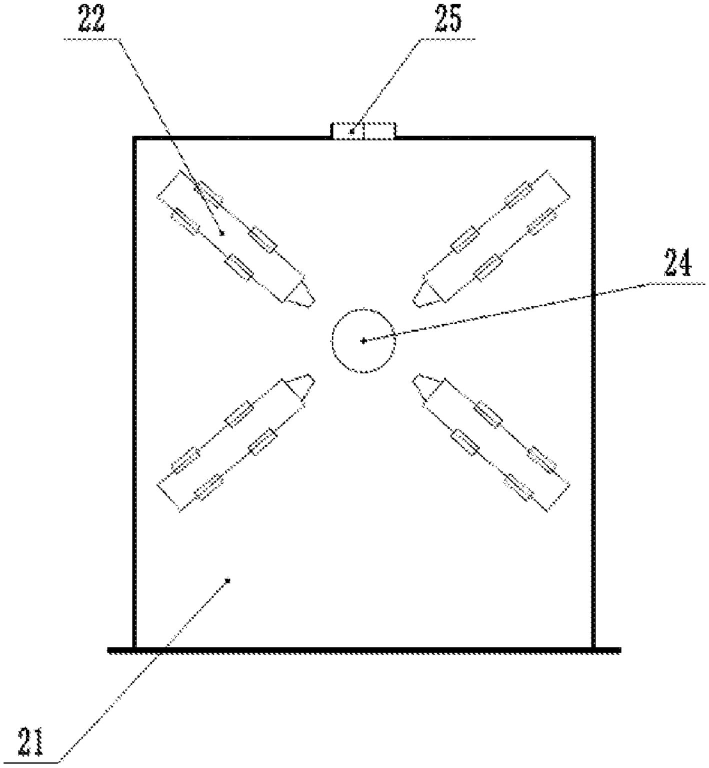
FIG. 4 is an internal schematic diagram of a laser cleaning tank.
Figure 5:
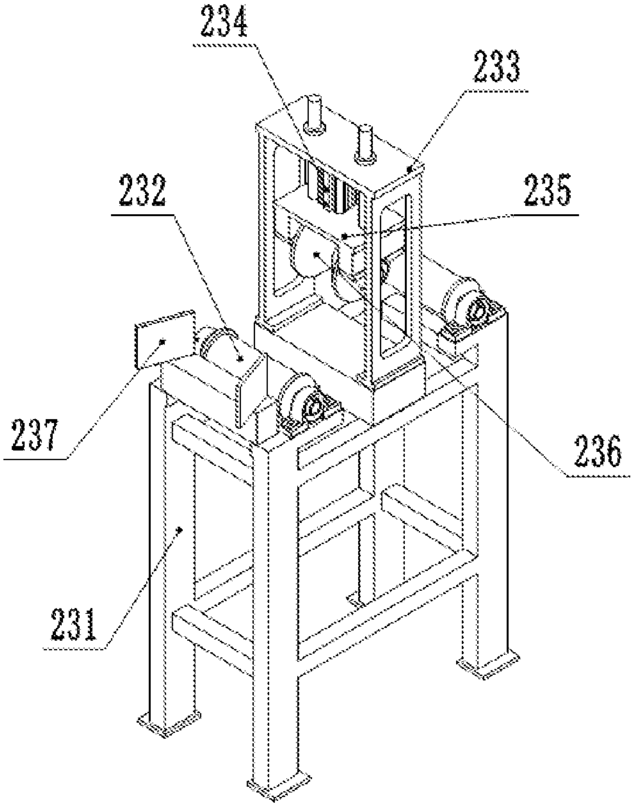
FIG. 5 is a schematic diagram of a cleaning conveying mechanism from one perspective.
Figure 6:
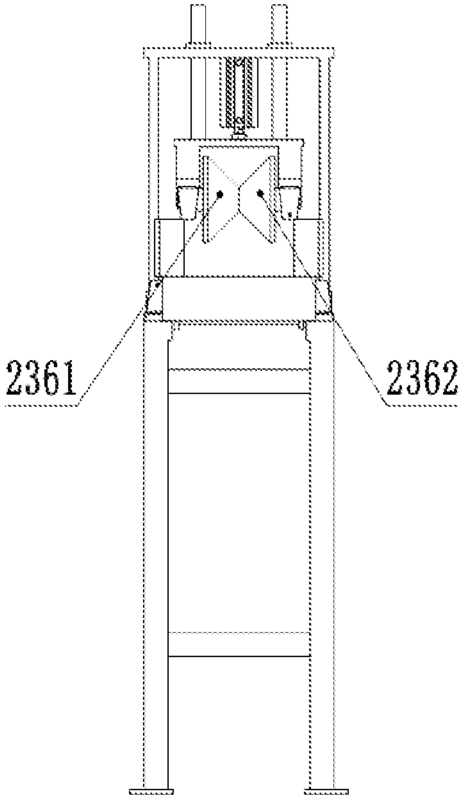
FIG. 6 is a schematic diagram of the cleaning conveying mechanism from another perspective.
Figure 7:
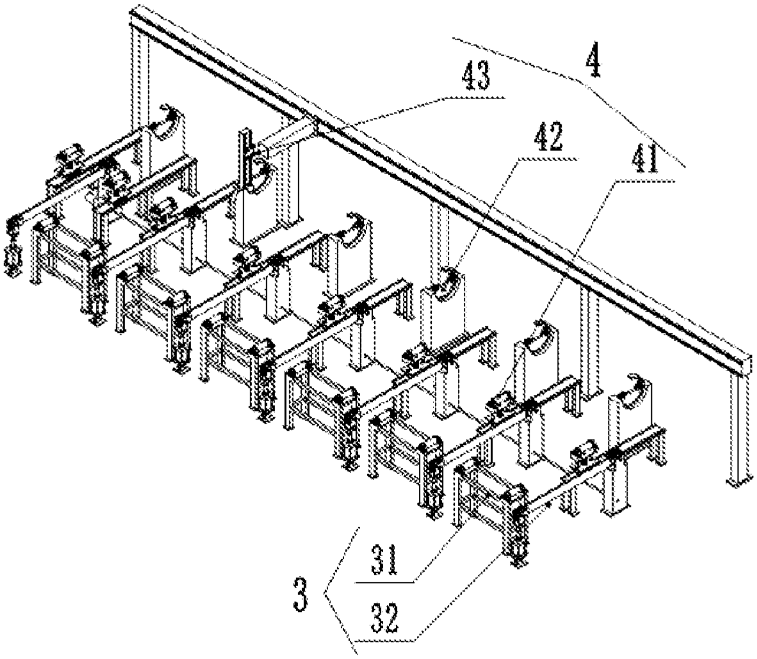
FIG. 7 is a schematic diagram of a first transfer system and an aluminum thermal-spraying system.
Figure 8:
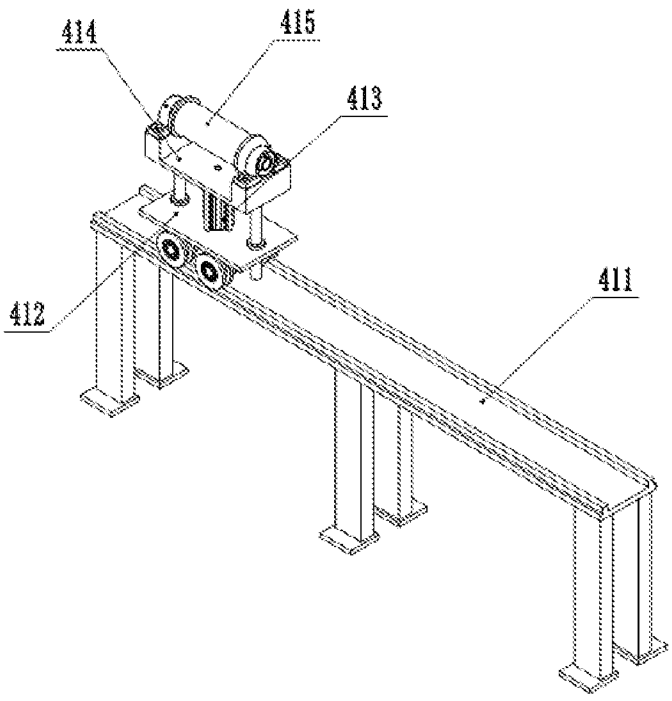
FIG. 8 is a schematic diagram of a traveling mechanism.
Figure 9:
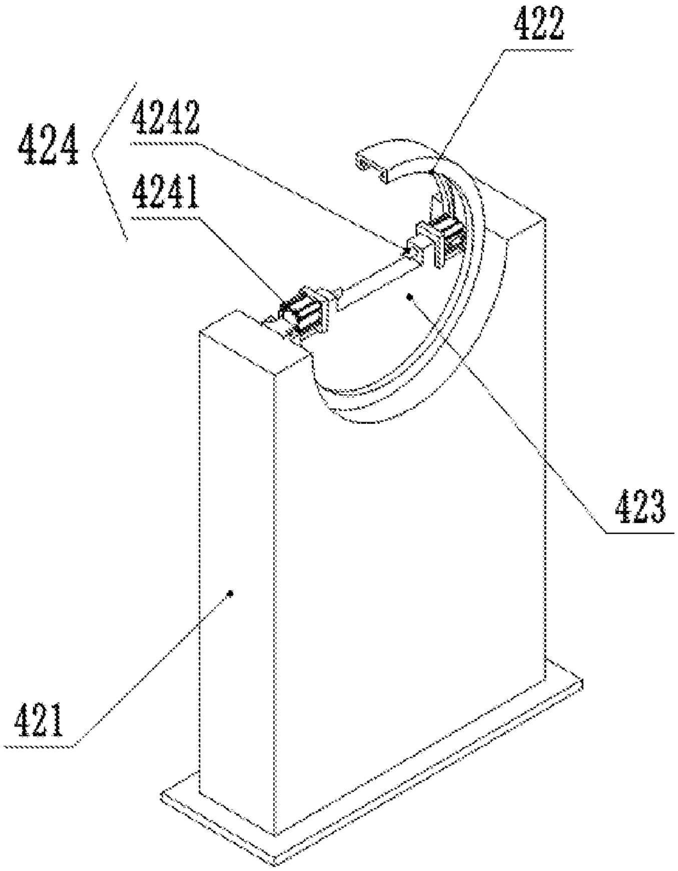
FIG. 9 is a schematic diagram of a turning mechanism.
Figure 10:
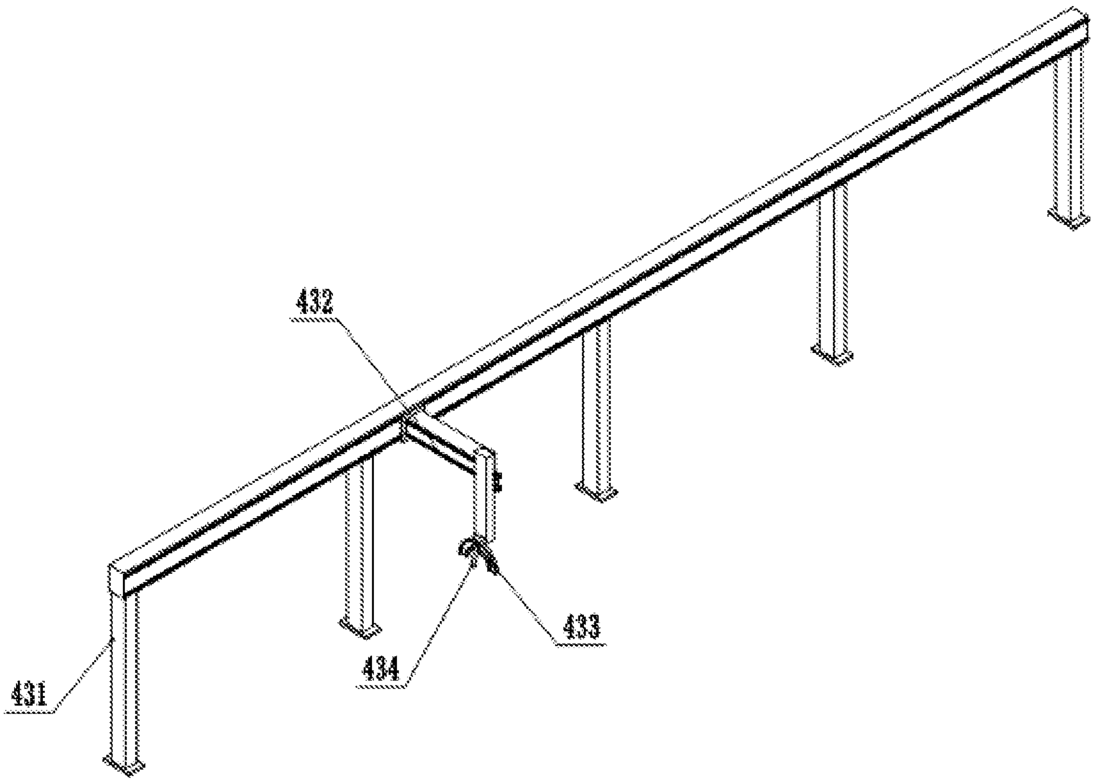
FIG. 10 is a schematic diagram of an aluminum spraying mechanism.
Figure 11:
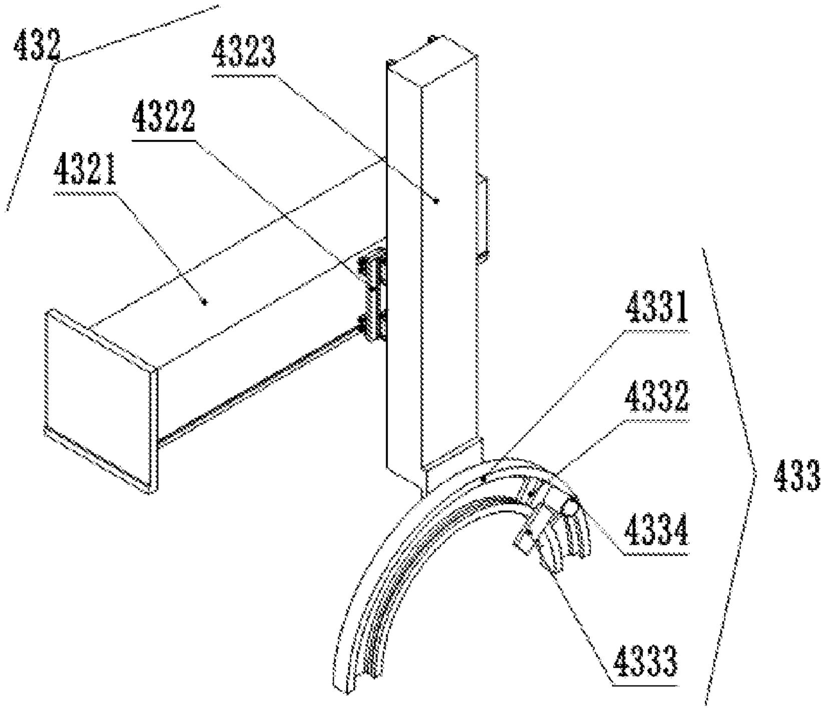
FIG. 11 is a schematic diagram of a three-axis moving assembly and an angle adjustment assembly.
Figure 12:
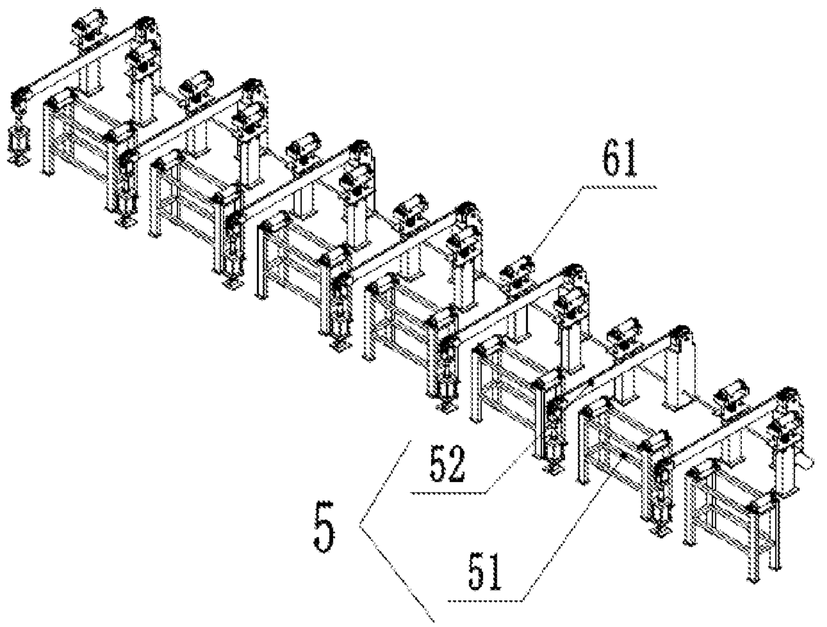
FIG. 12 is a schematic diagram of a second transfer system.
Figure 13:
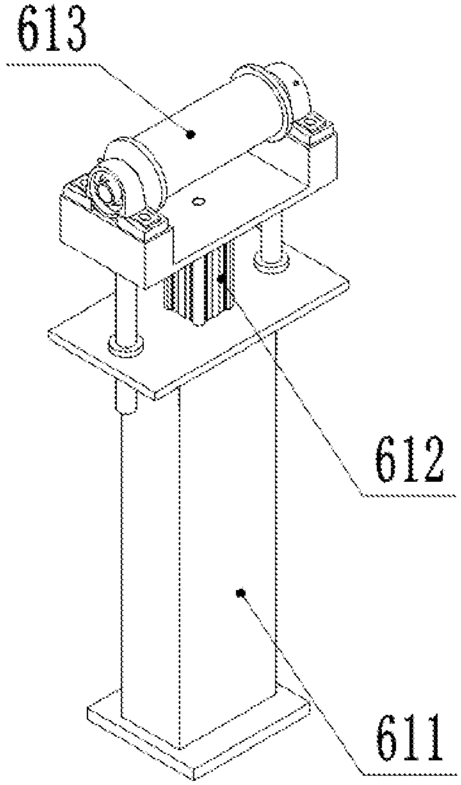
FIG. 13 is a schematic diagram of a rolling conveying mechanism.
Figure 14:
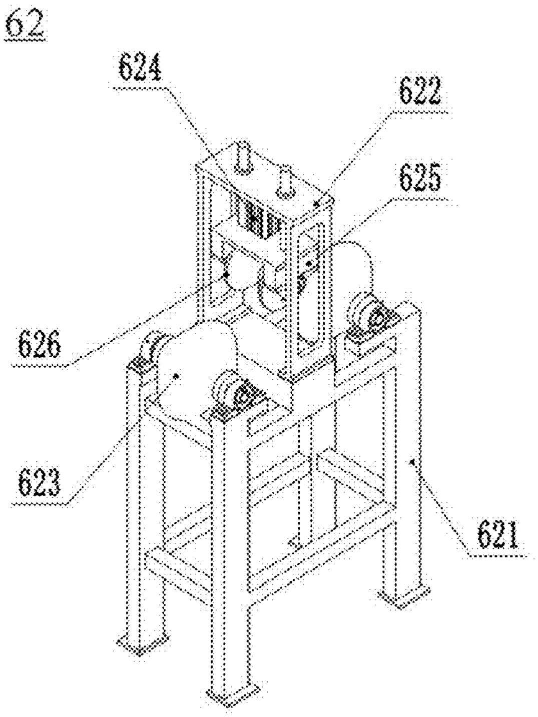
FIG. 14 is a schematic diagram of a rolling mechanism from one perspective.
Figure 15:
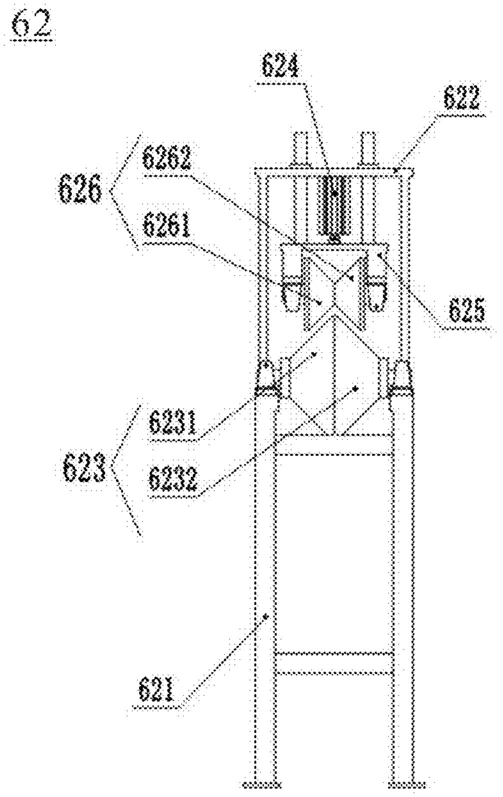
FIG. 15 is a schematic diagram of the rolling mechanism from another perspective.
Figure 16:
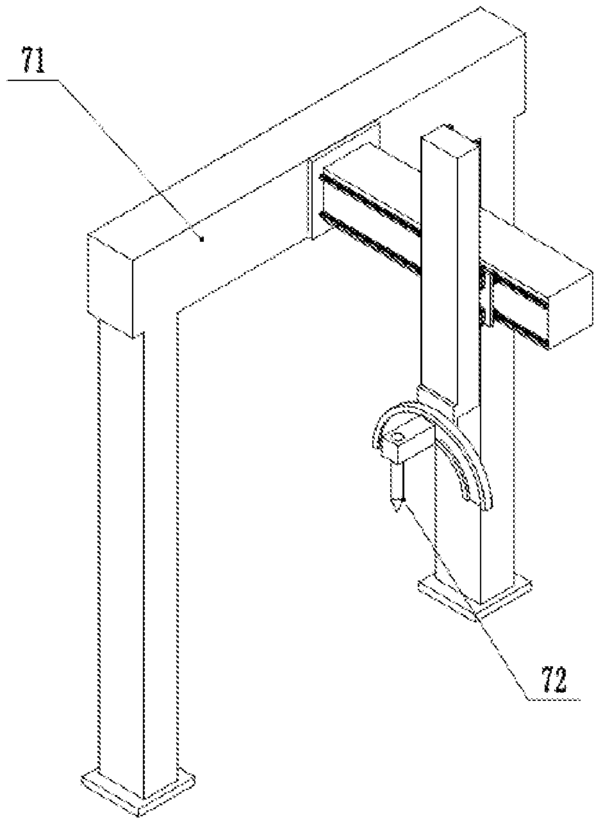
FIG. 16 is a schematic diagram of a laser cutting system.
Figure 17:
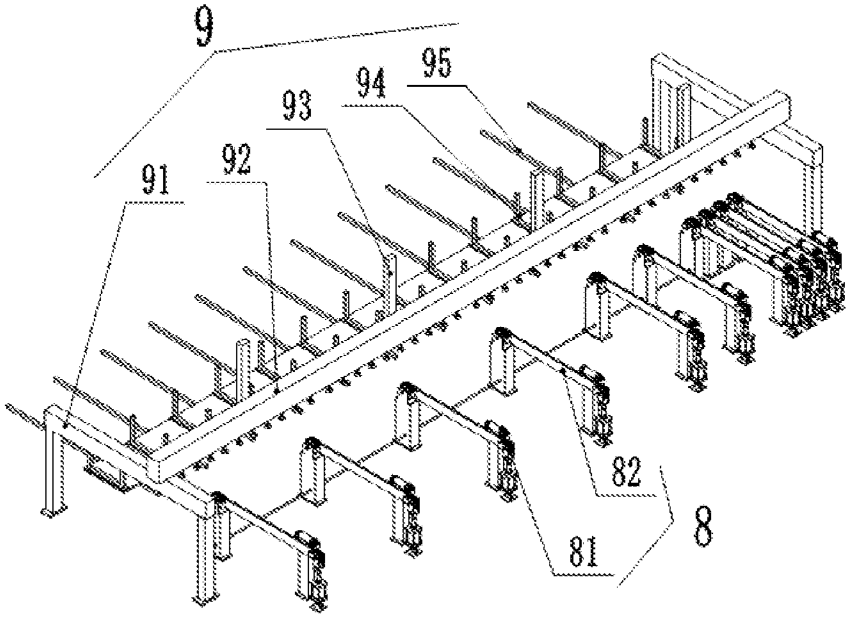
FIG. 17 is a schematic diagram of a third transfer system and a discharging and stacking system.

Referring to FIG. 1-FIG. 17, this embodiment provides a digital and informationized fully-automatic aluminum thermal-spraying production line, which includes an automatic feeding system 1, a laser cleaning system 2, a first transfer system 3, an aluminum thermal-spraying system 4, a second transfer system 5, an automatic rolling system 6, a laser cutting system 7, a third transfer system 8, and a discharging and stacking system 9.

The automatic feeding system 1 is used for automatically pushing workpieces into a production line conveying system to complete automatic feeding. The automatic feeding system 1 includes first transfer mechanisms 11 and first carrying conveying mechanisms 12, and the first transfer mechanisms 11 are able to convey the workpieces onto the first carrying conveying mechanisms 12 one-by-one.

Specifically, the first transfer mechanism 11 includes a transfer frame 111, a chain conveying mechanism 112 and a transfer lifting mechanism 113, wherein one end of the chain conveying mechanism 112 is hinged to the top of the transfer frame 111, and the other end of the chain conveying mechanism 112 is hinged to the top of the transfer lifting mechanism 113, such that the transfer lifting mechanism 113 can drive one end of the chain conveying mechanism 112 move upwards and downwards. The first carrying conveying mechanism 12 includes a carrying frame 121 and conveying drive rollers 122, a plurality of carrying frames 121 are disposed between a plurality of transfer frames 111 side by side and are spaced from each other, and the conveying drive rollers 122 are rotatably disposed on the carrying frame 121. In the operating state, a workpiece is placed at the end, close to the transfer frame 111, of the chain conveying mechanism 112, and then the chain conveying mechanism 112 drives the workpiece to move forwards; when the workpiece is moved to the side, close to the transfer lifting mechanism 113, of the chain conveying mechanism 112 and is located above the corresponding conveying drive roller 122, the transfer lifting mechanism 113 contracts downwards to allow the workpiece on the chain conveying mechanism 112 to fall onto the conveying drive roller 122, and at this moment, the workpiece is driven by the conveying drive roller 122 to move forwards; then, the transfer lifting mechanism 113 moves upwards until the chain conveying mechanism 112 is higher than the conveying drive roller 122; and this process is repeated to realize continuous conveying of workpieces. In this embodiment, the transfer lifting mechanism 113 may be a hydraulic cylinder and is provided with a telescopic rod connected to one end of the chain conveying mechanism 112. In this embodiment, the workpeices may be flat steel/angle steel.

The laser cleaning system 2 is mainly used for cleaning the surface of workpeices. The laser cleaning system 2 includes a laser cleaning tank 21, laser cleaning nozzles 22 and cleaning conveying mechanisms 23, wherein a cleaning hole 24 is formed in the laser cleaning tank 21, the laser cleaning nozzles 22 are mounted in the laser cleaning tank 21 and face the cleaning hole 24, the cleaning conveying mechanisms 23 are mounted on two sides of the laser cleaning tank 21, and one end of the cleaning conveying mechanisms 23 is flush with the first carrying conveying mechanisms 12.

Laser cleaning, as a new technique based on interaction between laser and substances, can apply ultrahigh-peak and short-pulse laser to workpieces, dirt, rust or coatings on the surface of the workpieces absorb the laser to be evaporated or stripped instantly, while the workpieces hardly absorb the laser, such that the dirt on the surface of the workpieces is removed without causing damage to base materials. Compared with traditional cleaning methods, laser cleaning is a high-quality, high-efficiency, energy-saving and environmentally-friendly new cleaning process, and has the following advantages: 1, laser cleaning is safe and free of contact, and will not cause damage to base materials; 2, cleaning is accurate and controllable, the cleaning area can be selected, and micro-level accuracy control can be realized in the thickness direction; 3, the comprehensive cost is low, no consumable is used by laser cleaning equipment, and only electric energy is consumed; and 4, the applicability and flexibility are high, and integration and automation can be realized easily.

Specifically, at least four laser cleaning nozzles 22 are regularly disposed around the cleaning hole 24 at intervals, such that the surface of the workpieces can be cleaned in all direction, and the work efficiency is improved.

Specifically, the cleaning conveying mechanism 23 includes a cleaning pedestal 231, rotary rollers 232, a pressing frame 233, a pressing drive mechanism 234, a pressing wheel carrier 235 and a pressing wheel 236, wherein the rotary rollers are rotatably mounted on the cleaning pedestal 231, the pressing frame 233 is mounted on the cleaning pedestal 231, the pressing drive mechanism 234 is mounted on the pressing frame 233, the pressing wheel carrier 235 is mounted on the pressing drive mechanism 234, the pressing wheel 236 is mounted on the pressing wheel carrier 235, and the pressing drive mechanism 234 is able to drive the pressing wheel 236 to move upwards and downwards. In the operating state, workpieces are conveyed by the first carrying conveying mechanisms 12 onto the cleaning conveying mechanisms 23 and are driven by the rotary roller 232 to move outwards, the surface of the workpieces is cleaned by the laser cleaning nozzles 22 when the workpieces pass through the cleaning hole 24, and during the moving process of the workpieces, the pressing drive mechanism 234 drives the pressing wheel 236 to move downwards to abut against the upper surface of the workpieces to keep the position and form of the workpieces unchanged, such that shaking of the workpieces is prevented, and the cleaning effect will not be affected. In this embodiment, the pressing drive mechanism 234 is a hydraulic cylinder, and is provided with a base mounted on the pressing frame 233 and a telescopic rod having a free end connected to the pressing wheel carrier 235, a guide rod is mounted between the wheel carrier and the pressing frame 233, and the axial direction of the guide rod is the same as the moving direction of the pressing wheel 236.

When the workpieces are angle steel, the pressing wheel 236 includes a first pressing part 2361 and a second pressing part 2362, wherein the first pressing part 2361 and the second pressing part 2362 are conical, an angle matched with the angle steel is formed between the first pressing part 2361 and the second pressing part 2362, and by adopting such a structure, the cleaning stability of the angle steel can be further improved. Limit members 237 are mounted on the cleaning pedestal 231 on two sides of the cleaning hole 24, each limit member 237 is formed by two stop plates which are arranged in a splayed manner, and under the action of the limit members 237, the workpieces can be always located in the middle of the cleaning hole 23, such that the cleaning effect is improved. A dust outlet 25 is formed in the top of the laser cleaning tank 21 and is connected to a negative-pressure dust emission system.

The first transfer system 3 is mainly used for receiving, storing and transfer cleaned workpieces. The first transfer system 3 includes second carrying conveying mechanisms 31 and second transfer mechanisms 32, wherein the second carrying conveying mechanisms 31 are flush with the other end of the cleaning conveying mechanisms 23, and the second transfer mechanisms 32 are able to convey workpieces on the second carrying conveying mechanisms 31 one-by-one.

Specifically, the second carrying conveying mechanism 31 is identical with the first carrying conveying mechanism 12 in structure, and the second transfer mechanism 32 is identical with the first transfer mechanism 11 in structure. In the operating state, a cleaned workpiece conveyed from the cleaning conveying mechanism 23 enters the second carrying conveying mechanism 31, the transfer lifting mechanism 113 drives the chain conveying mechanism 112 at this end to move upwards to jack the workpiece placed on the conveying drive roller 122, then the chain conveying mechanism 112 drives the workpiece to move forwards to leave the conveying drive roller 122, then the transfer lifting mechanism 113 drives the chain conveying mechanism 112 to move downwards to be located below the conveying drive roller 122 to wait for the next workpiece, and in this way, workpieces are continuously transferred to the end close to the transfer frame 111.

The aluminum thermal-spraying system 4 is mainly used for performing aluminum arc thermal spraying on the surfaces of workpieces. The aluminum thermal-spraying system 4 includes traveling mechanisms 41, turning mechanisms 42 and an aluminum spraying mechanism 43, wherein the traveling mechanisms 41 are able to convey workpieces from the second carrying conveying mechanisms 31 onto the turning mechanisms 42 one-by-one, the turning mechanisms 42 are able to turn the workpieces by a preset angle, and the aluminum spraying mechanism 43 is able to perform aluminum arc-spraying on the workpieces.

Specifically, the traveling mechanism 41 includes a traveling rail 411, a traveling trolley 412, a traveling lifting mechanism 413, a traveling pedestal 414 and a traveling drive roller 415, wherein the traveling trolley 412 is able to move along the traveling rail 411, the traveling lifting mechanism 413 is disposed on the traveling trolley 412, the traveling pedestal 414 is disposed on the traveling lifting mechanism 413, the traveling drive roller 415 is rotatably disposed on the traveling pedestal 414, and the traveling lifting mechanism 413 is able to drive the traveling drive roller 415 to move upwards and downwards. In this embodiment, the traveling lifting mechanism 413 may be a hydraulic cylinder, and is provided with a base mounted on the traveling trolley 412 and a telescopic rod having a free end connected to the traveling pedestal 414, a guide rod is mounted between the travelling trolley 412 and the traveling pedestal 414, a convex rails are disposed on two sides of an end face of the traveling rail 411, traveling wheels are disposed at the bottom of the traveling trolley 412, and grooves matched with the convex rails are formed in the traveling wheels. In the operating state, the traveling trolley 412 moves to the side, close to the transfer frame 111, of the second transfer mechanism 32, and is located right below a workpiece, then the traveling lifting mechanism 413 drives the traveling drive roller 415 to move upwards to jack the workpiece, and then the traveling trolley 412 drive the workpiece to move forwards.

Specifically, the turning mechanism 42 includes a turning frame 421, an arc-shaped sliding rail 422, an arc-shaped slider 423 and a clamping assembly 424; the turning frames 421 are mounted at one end of the traveling rails 411 and are spaced from each other, the arc-shaped sliding rail 422 is mounted on the turning frame 421, the arc-shaped slider 423 is slidably mounted on the arc-shaped sliding rail 422, and the clamping assembly 424 is mounted on the arc-shaped slider 423. An arc-shaped rack is disposed on the periphery of the arc-shaped slider 423, and the arc-shaped rack is connected to a drive gear and is driven by the drive gear to move to drive the arc-shaped slider 423 to move along the arc-shaped sliding rail 422. The clamping assembly 424 includes clamping cylinders 4242 and clamping members 4242, wherein the two clamping cylinders 4241 are disposed on the arc-shaped slider 423 and are spaced from each other, the two clamping members 4242 are connected to the two clamping cylinders 4241 respectively, and the clamping cylinders 4241 are able to drive the two clamping members 4242 to move close to or away from each other to clamp or release workpieces. In the operating state, the traveling trolley 412 moves a workpiece to a position above the arc-shaped slider 423, then the traveling lifting mechanism 413 drives the traveling drive roller 415 to move downwards to place the workpiece between the two clamping members 4242, then the two clamping cylinders 4241 drive the clamping members 4242 to move close to each other to clamp the workpiece, and then the drive gear drives the arc-shaped rack to move to drive the arc-shaped slider 423 to move along the arc-shaped sliding rail 422 by a certain angle to turn the lower surface of the workpiece upwards or laterally to facilitate arc spraying. After that, the two clamping members 4242 move away from each other to release the workpiece, and then the traveling lifting mechanism 413 drives the traveling drive roller 415 to move upwards to jack the workpiece and then move back along the traveling guide rail by a certain distance to enter the next process.

Specifically, the aluminum spraying mechanism 43 includes an aluminum spraying frame 431, a three-axis moving assembly 432, an angle adjustment assembly 433 and a spray gun 434, wherein the aluminum spraying frame 431 is mounted on one side of the turning frames 421, the three-axis moving assembly 432 is mounted on the aluminum spraying frame 431, and the spray gun 434 is mounted on the three-axis moving assembly 432 through the angle adjustment assembly 433.

Specifically, the three-axis moving assembly 432 includes a horizontal beam 4321, a sliding seat 4322 and a vertical beam 4323, wherein the horizontal beam 4321 is mounted on the aluminum spraying frame 431 and is able to move horizontally on the aluminum spraying frame 431, the sliding seat 4322 is slidably mounted on the horizontal beam 4321, the vertical beam 4323 is slidably mounted on the sliding seat 4322, and the angle adjustment assembly 433 is mounted at a lower end of the vertical beam 4323.

Specifically, the angle adjustment assembly 433 includes an arc-shaped sliding groove 4331, an arc-shaped sliding block 4332 and a mounting base 4333, wherein the arc-shaped sliding block 4332 is slidably mounted in the arc-shaped sliding groove 4331, the mounting base 4333 is connected to the arc-shaped sliding block 4332 and is located outside the arc-shaped sliding groove 4331, an arc-shaped rack is disposed in the arc-shaped sliding groove 4331, a drive gear engaged with the arc-shaped rack is disposed on the arc-shaped sliding block 4332, a drive motor 4334 is disposed on the arc-shaped sliding block 4332, and the drive motor 4334 drives the drive gear to rotate to drive the mounting base 433 to move along the arc-shaped sliding groove 4331. In the operating state, the drive motor 4334 rotates to drive the drive gear to rotate, so the drive rack is driven to move along the arc-shaped sliding groove 4331 to drive the mounting base 4333 and the spray gun 434 to move. This structure is not only suitable for spraying treatment of flat steel, but also can change to the spraying direction of the spray gun 434 through the angle adjustment assembly 433 to adapt spraying treatment of angle steel, such that the spraying efficiency is improved.

In this embodiment, when the clamping assembly 424 clamps a workpiece, the spray gun 434 is controlled to perform spraying treatment on the upper surface of the workpiece; after spraying treatment on the upper surface of the workpiece is completed, the arc-shaped slider 423 moves along the arc-shaped sliding rail 422 by a certain distance to turn the workpiece over, and then the spray gun 434 is controlled to perform arc spraying treatment on the upper surface of the workpiece again, such that all the surfaces of the workpiece are sprayed. After spraying is completed, the arc-shaped slider 423 moves along the arc-shaped sliding rail 422 to return to the initial horizontal position. The traveling lifting mechanism 413 drives the traveling pedestal 414 to move upwards to drive the traveling drive roller 415 to jack the workpiece, then the traveling trolley 413 moves backwards along the traveling rail 411 by a certain distance, and finally, the traveling drive roller 415 conveys the workpiece out.

The system adopts the aluminum arc thermal spraying process, which melts metal by means of an electric arc burning between two continuously fed metal wires, atomizes the molten metal by means of a high-speed air flow, and accelerates atomized metal particles to enable them be sprayed toward a workpiece to form a coating. Arc spraying is a thermal spraying method commonly used in actual application such as corrosion prevention, abrasion prevention and maintenance of mechanical parts of steel structures. Compared with flame spraying, arc spraying has the following advantages: 1, the heat efficiency is high; the heat utilization rate of flame spraying is only 5%-10%, and the utilization rate of electric energy of arc spraying can reach 60%-70%; 2, the production efficiency is higher: the production efficiency of the arc spraying technique is high, which is generally over three times that of flame spraying; 3, the bonding strength of coatings is high: through arc spraying, high bonding strength can be obtained without increasing the temperature of workpieces or using precious base metal; 4, the production cost is low: the cost of arc spraying is 30% lower than that of flame spraying; 5, operation is easy, safe and reliable: arc spraying equipment is not provided with a complicated operating mechanism, the spraying quality can be guaranteed as long as process parameters are set within specified ranges according to different spraying materials; only electric energy and compressed air are used, inflammable gas such as oxygen and acetylene are not needed, so arc spraying is safe and reliable, and is suitable for field operation; 6, pseudo-alloy coatings can be prepared: through arc spraying, pseudo-alloy coatings can be prepared by means of two metal wires with different components, to obtain unique comprehensive performance.

The second transfer system 5 is mainly used for receiving, storing and transferring workpieces subjected to arc spraying. The second transfer system 5 includes third carrying conveying mechanisms 51 and third transfer mechanisms 52, wherein the third carrying conveying mechanisms 51 are able to receive workpieces conveyed from the traveling mechanisms 41, and the third transfer mechanisms 52 are able to convey the workpieces on the third carrying conveying mechanisms 51 one-by-one.

Specifically, the third carrying conveying mechanism 51 is identical with the first carrying conveying mechanism 12 in structure, and the third transfer mechanism 52 is identical with the first transfer mechanism 11 in structure. In the operating state, a workpiece subjected to arc spraying comes out of traveling drive roller 415 of the traveling trolley 412 and enters the third carrying conveying mechanism 31, the transfer lifting mechanism 113 drives the chain conveying mechanism 112 at this end to move upwards to jack the workpiece placed on the conveying drive roller 122, then the chain conveying mechanism 112 drives the workpiece to move forwards to leave the conveying drive roller 122, then the transfer lifting mechanism 113 drives the chain conveying mechanism 112 to move downwards to be located below the conveying drive roller 122 to wait for the next workpiece, and in this way, workpieces are continuously transferred to the end close to the transfer frame 111.

The automatic rolling system 6 is mainly used for mechanically rolling coatings obtained through arc spraying to ensure the quality of the coatings. The automatic rolling system 6 includes rolling conveying mechanisms 61 and rolling mechanisms 62, wherein the rolling conveying mechanisms 61 are able to convey workpieces on the third transfer mechanisms 52 one-by-one, and the rolling mechanisms 62 are able to roll the workpieces.

Specifically, the rolling conveying mechanism 61 includes a rolling conveying stand 611, a rolling conveying drive mechanism 612 and a rolling conveying roller 613, a plurality of rolling conveying stands 611 are mounted at the ends, close to the transfer frames 111, of the third transfer mechanisms 52, the rolling conveying drive mechanism 612 is mounted on the rolling conveying stand 611, the rolling conveying roller 613 is mounted on the rolling conveying drive mechanism 612, and the rolling conveying drive mechanism 612 is able to drive the rolling conveying roller 613 to move upwards and downwards. In this embodiment, the rolling conveying drive mechanism 612 may be a hydraulic cylinder. In the operating state, when a workpiece is conveyed by the chain conveying mechanism 112 to a position above the rolling conveying roller 613, the rolling conveying drive mechanism 612 drives the rolling conveying roller 613 to move upwards to jack the workpiece; then, the rolling conveying roller 613 conveys the workpiece forwards; and finally, the rolling conveying drive mechanism 612 drives the rolling conveying roller 613 to move downwards to be located below the rolling conveying drive mechanism 612 to wait for the next workpiece.

Specifically, the rolling mechanism 62 includes a rolling pedestal 621, a rolling frame 622, at least two first rolling wheels 623, a rolling drive mechanism 624, a rolling wheel carrier 625 and a second rolling wheel 626, the at least two first rolling wheels 623 are rotatably disposed on the rolling pedestal 621 and are spaced from each other, the rolling frame 622 is disposed on the rolling pedestal 621, the rolling drive mechanism 624 is disposed on the rolling frame 622, the rolling wheel carrier 625 is mounted on the rolling drive mechanism 624, the second rolling wheel 626 is rotatably mounted on the rolling wheel carrier 625, and the rolling drive mechanism 624 is able to drive the second rolling wheel 626 to move upwards and downwards. In the operating state, the rolling conveying roller 613 conveys a workpiece onto the first rolling wheels 623, and during the moving process of the workpiece, the rolling drive mechanism 624 drives the second rolling wheel 626 to move downwards to abut against the upper surface of the workpiece to mechanically roll an arc spray coating of the workpiece from top and bottom respectively, such that the quality of the coating is guaranteed. In this embodiment, the rolling drive mechanism 624 is a hydraulic cylinder, and is provided with a base mounted on the rolling frame 622 and a telescopic rod having a free end connected to the rolling wheel carrier 625, a guide rod is mounted between the rolling wheel carrier 625 and the rolling frame 622, and the axial direction of the guide rod is the same as the moving direction of the second rolling wheel 626.

When the workpieces are angle steel, the first rolling wheel 623 includes a first rolling part 6231 and a second rolling part 6232, the first rolling part 6231 and the second rolling part 6232 are conical, and an angle matched with the angle steel is formed between the first rolling part 6231 and the second rolling part 6232; and the second rolling wheel 626 includes a third rolling part 6261 and a fourth rolling part 6262, the third rolling part 6261 and the fourth rolling part 6262 are conical, and an angle matched with the angle steel is formed between the third rolling part 6261 and the fourth rolling part 6262, such that all surfaces of the angle steel can mechanically rolled at a time.

The laser cutting system 7 is mainly used for cutting workpieces. The laser cutting system 7 includes a laser frame 71 and a laser cutting head 72, wherein the laser frame 71 is mounted behind the rolling mechanisms 62, and the laser cutting head 72 is mounted on the laser frame 71. In the operating state, when a workpiece moves in front of the laser frame 71 by a preset distance, the laser cutting head 72 cuts the workpiece by a fixed length.

The third transfer system 8 is mainly used for receiving, storing and transferring cut workpieces. The third transfer system 8 includes fourth carrying conveying mechanisms 81 and fourth transfer mechanisms 82, wherein the fourth carrying conveying mechanisms 81 are able to receive the cut workpieces, and the fourth transfer mechanisms 82 are able to convey the workpieces on the fourth carrying conveying mechanisms 81 one-by-one. The third transfer system 8 can also check whether the workpieces needs to be re-sprayed.

Specifically, the fourth carrying conveying mechanism 81 is identical with the first carrying conveying mechanism 12 in structure, and the fourth transfer mechanism 82 is identical with the first transfer mechanism 11 in structure. In the operating state, a cut workpiece is moved to the fourth carrying conveying mechanism 81, the transfer lifting mechanism 113 drives the chain conveying mechanism 112 at this end to move upwards to jack the workpiece placed on the conveying drive roller 122, then the chain conveying mechanism 112 drives the workpiece to move forwards to leave the conveying drive roller 122, then the transfer lifting mechanism 113 drives the chain conveying mechanism 112 to move downwards to be located below the conveying drive roller 122 to wait for the next workpiece, and in this way, workpieces are continuously transferred to the end close to the transfer frame 111.

The discharging and stacking system 9 is used for discharging workpieces from the fourth carrying conveying mechanisms 81 and stacking the workpieces. The discharging and stacking system 9 includes a discharging frame 91, a moving mechanism 92 and a grabbing mechanism 93, wherein the moving mechanism 92 is movably mounted on the discharging frame 91, the grabbing mechanism 93 is mounted on the moving mechanism 92, and the grabbing mechanism 93 is used for grabbing workpieces placed on the fourth carrying conveying mechanisms 81. In this embodiment, the moving mechanism 92 can drive the grabbing mechanism 93 to move upwards and downwards, the grabbing mechanism 93 includes a plurality of chucks, a stacking frame 94 and a discharging rail 95 are mounted on the ground, and the stacking frame 94 is movably mounted on the discharging rail 95. In the operating state, the moving mechanism 92 drives the grabbing mechanism 93 to move to be located above the fourth transfer mechanism 82, then the grabbing mechanism 93 moves downwards and grabs workpieces through the chucks, then the grabbing mechanism 93 is controlled to move upwards and horizontally to be located above the stacking frame 93 and then place the workpieces on the stacking frame 94, and when full of workpieces, the stacking frame 94 is pushed out through the discharging rail 95.

To discharge exhaust gas timely, relatively closed process chambers may be designed above the aluminum thermal-spraying system 4, the automatic rolling system 8, the laser cutting system 7 and the discharging and stacking system 9, and are connected to the negative-pressure dust emission system.

The production process of the fully-automatic aluminum thermal-spraying production line is as follows: workpieces placed on the first transfer mechanisms 11 are conveyed onto the first carrying conveying mechanisms 12 one-by-one, and then pushed by the cleaning conveying mechanisms 23 to the cleaning hole 24 to be cleaned (repeatedly) by the laser cleaning nozzles 22; after being cleaned, the workpieces enter the first transfer system 3 to be sprayed; then, the first transfer system 3 conveys the workpieces onto the traveling mechanisms one-by-one, and the traveling mechanisms 41 convey the workpieces into the turning mechanisms 42; the workpieces are clamped by the clamping assemblies 424 first, and then the upper surface and side faces of the workpieces are sprayed by the aluminum spraying mechanism 43; after that, the turning mechanisms 42 turn the workpieces over, and then the upper surface and side faces of the workpieces are sprayed by the aluminum spraying mechanism 43, such that all surfaces of the workpieces are sprayed; after spraying is completed, the workpieces are conveyed by the traveling mechanisms 41 into the second transfer system 5 to be stored temporarily; the workpieces are conveyed by the second transfer system 5 onto the rolling conveying mechanisms 61 and are mechanically rolled by the rolling mechanisms 62 to ensure the quality of coatings; then, the workpieces are cut by the laser cutting system 7 by a fixed length, and then enter to the third transfer system 8 to be stored temporarily; and finally, the workpieces are discharged and stacked by the discharging and stacking system 9.

The fully-automatic aluminum thermal-spraying production line of the invention provides a fully-automatic intelligent production scheme for automatic laser cleaning and automatic aluminum thermal-spraying of angle steel/flat steel, has the functions of automatic feeding, automatic conveying, automatic laser cleaning, automatic aluminum thermal-spraying, automatic cutting and automatic stacking, can be equipped with a production line intelligent control system such as a data-based intelligent manufacturing and information-based management and control platform, greatly improves the cleaning and aluminum spraying efficiency of angle steel/flat steel, reduces the production cost, and has good economic benefits.

The fully-automatic aluminum thermal-spraying production line is centered on "automation, digitization, informatization and intelligentization", and realizes production data acquisition, instruction issuing and production control during the production process. The fully-automatic aluminum thermal-spraying production line has the following advantages:

1. Automation: through a centralized management and control method based on bus communication, all devices or systems are centralized in a management and control platform to be managed in a unified manner, to realize fully-automatic production; and all the devices or systems such as a conveying line system, a laser derusting system, the aluminum thermal-spraying system 4, the laser cutting system 7 and the discharging and stacking system 9 are automatically controlled through control interfaces to guarantee full-automation production of the production line.
2. Digitization: the production process and state are converted into digital information through various detection and measurement means such as sensors and counters, and devices and systems are digitally controlled in a unified manner, such that full-digital management and control of the production line is realized.
3. Informatization: information-based management of the production line is realized through effective data acquisition and digital management and control, such that operators or managers can easily monitor the whole production process such as the laser cleaning speed and the thermal spraying efficiency; not only can the functions of temporary data storage during production data acquisition, retransmission in case of a network outage, threshold comparison, waveform display, process issuing, and log-in with a card be realized, but also analog quantity/digital quantity acquisition, extended functions and application integration can be realized, and the most direct man-machine interaction between welders and workshop information systems is provided.
4. Intelligentization: key data parameters such as the operating condition and process parameters of the system are acquired through control signal interfaces and data communication interfaces of sub-systems to realize whole-process and comprehensive data extraction of the whole production line; and all data is sent to a data-based intelligent manufacturing system to be processed and displayed in real time and are intelligently controlled through an information-based management and control system, for example, process parameters of laser cleaning or aluminum thermal-spraying are intelligently called according to workpiece information, and parameters of the production line are reasonably optimized by monitoring the real-time state of stations, such that dynamic adjustment of the production line is realized.

The above embodiments express several implementations of the invention and are specifically described in detail, but these embodiments should not be construed as limiting the patent scope of the invention. It should be pointed out that various modifications and improvements can be made by those ordinarily skilled in the art without departing from the concept of the invention, and all these modifications and improvements fall within the protection scope of the invention. Therefore, the protection scope of the invention should be defined by the appended claims.

What is claimed is:

1. A digital and informationized fully-automatic aluminum thermal-spraying production line, comprising:

an automatic feeding system comprising first transfer mechanisms and first carrying conveying mechanisms, wherein the first transfer mechanisms are configured to convey workpieces onto the first carrying conveying mechanisms one-by-one;

a laser cleaning system comprising a laser cleaning tank, laser cleaning nozzles and cleaning conveying mechanisms, wherein a cleaning hole is formed in the laser cleaning tank, the laser cleaning nozzles are disposed in the laser cleaning tank and face the cleaning hole, the cleaning conveying mechanisms are disposed on two sides of the laser cleaning tank, and a first end of the cleaning conveying mechanisms is flush with the first carrying conveying mechanisms;

a first transfer system comprising second carrying conveying mechanisms and second transfer mechanisms, wherein the second carrying conveying mechanisms are flush with a second end of the cleaning conveying mechanisms, and the second transfer mechanisms are configured to convey workpieces on the second carrying conveying mechanisms;

an aluminum thermal-spraying system comprising traveling mechanisms, turning mechanisms and an aluminum spraying mechanism, wherein the traveling mechanisms are configured to convey the workpieces from the second carrying conveying mechanisms onto the turning mechanisms one-by-one, the turning mechanisms are configured to turn the workpieces by a preset angle, and the aluminum spraying mechanism is configured to perform aluminum arc-spraying on the workpieces;

a second transfer system comprising third carrying conveying mechanisms and third transfer mechanisms, wherein the third carrying conveying mechanisms are configured to receive the workpieces conveyed from the traveling mechanisms, and the third transfer mechanisms are configured to convey the workpieces on the third carrying conveying mechanisms one-by-one; and an automatic rolling system comprising rolling conveying mechanisms and rolling mechanisms, wherein the rolling conveying mechanisms are configured to convey the workpieces on the third transfer mechanisms one-by-one, and the rolling mechanisms are configured to roll the workpieces.

2. The digital and informationized fully-automatic aluminum thermal-spraying production line according to claim 1, further comprising:

a laser cutting system comprising a laser frame and a laser cutting head, wherein the laser frame is disposed behind the rolling mechanisms, and the laser cutting head is disposed on the laser frame;

a third transfer system comprising fourth carrying conveying mechanisms and fourth transfer mechanisms, wherein the fourth carrying conveying mechanisms are configured to receive cut workpieces, and the fourth transfer mechanisms are configured to convey the workpieces on the fourth carrying conveying mechanisms one-by-one; and a discharging and stacking system used for discharging the workpieces from the fourth carrying conveying mechanisms and stacking the workpieces.

3. The digital and informationized fully-automatic aluminum thermal-spraying production line according to claim 2, wherein the first transfer mechanisms, the second transfer mechanisms, the third transfer mechanisms and the fourth transfer mechanisms are identical in structure, and each transfer mechanism of the first transfer mechanisms, the second transfer mechanisms, the third transfer mechanisms and the fourth transfer mechanisms comprises a given transfer frame, which is one of a plurality of transfer frames, a chain conveying mechanism and a transfer lifting mechanism, wherein the chain conveying mechanism has a first end hinged to a top of the given transfer frame and a second end hinged to a top of the transfer lifting mechanism;

the first carrying conveying mechanisms, the second carrying conveying mechanisms, the third carrying conveying mechanisms and the fourth carrying conveying mechanisms are identical in structure, and each carrying conveying mechanism of the first carrying conveying mechanisms, the second carrying conveying mechanisms, the third carrying conveying mechanisms and the fourth carrying conveying mechanisms comprises a given carrying frame, which is one of a plurality of carrying frames, and conveying drive rollers, wherein the plurality of carrying frames are disposed between the plurality of transfer frames at intervals, and the conveying drive rollers are rotatably disposed on the given carrying frame.

4. The digital and informationized fully-automatic aluminum thermal-spraying production line according to claim 1, wherein at least four of the laser cleaning nozzles are regularly disposed around the cleaning hole at intervals.

5. The digital and informationized fully-automatic aluminum thermal-spraying production line according to claim 1, wherein each of the cleaning conveying mechanisms comprises a cleaning pedestal, rotary rollers, a pressing frame, a pressing drive mechanism, a pressing wheel carrier and a pressing wheel, wherein the rotary rollers are rotatably disposed on the cleaning pedestal, the pressing frame is disposed on the cleaning pedestal, the pressing drive mechanism is disposed on the pressing frame, the pressing wheel carrier is disposed on the pressing drive mechanism, the pressing wheel is disposed on the pressing wheel carrier, and the pressing drive mechanism is configured to drive the pressing wheel to move upwards and downwards.

6. The digital and informationized fully-automatic aluminum thermal-spraying production line according to claim 5, wherein the workpieces are angle steel, and the pressing wheel comprises a first pressing part and a second pressing part, wherein the first pressing wheel and the second pressing wheel are conical, and an angle matched with the angle steel is formed between the first pressing part and the second pressing part.

7. The digital and informationized fully-automatic aluminum thermal-spraying production line according to claim 1, wherein each of the traveling mechanisms comprises a traveling rail, a traveling trolley, a traveling lifting mechanism, a traveling pedestal- and a traveling drive roller, wherein the traveling trolley is configured to move along the traveling rail, the traveling lifting mechanism is disposed on the traveling trolley, the traveling pedestal is disposed on the traveling lifting mechanism, the traveling drive roller is rotatably disposed on the traveling pedestal, and the traveling lifting mechanism is configured to drive the traveling drive roller to move upwards and downwards;

each of the turning mechanisms comprises a turning frame, an arc-shaped sliding rail, an arc-shaped slider and a clamping assembly, wherein the turning frames are disposed at one end of the traveling rails and are spaced from each other, the arc-shaped sliding rail is disposed on the turning frame, the arc-shaped slider is slidably disposed on the arc-shaped sliding rail, and the clamping assembly is disposed on the arc-shaped slider;

the aluminum spraying mechanism comprises an aluminum spraying frame, a three-axis moving assembly, an angle adjustment assembly and a spray gun, wherein the aluminum spraying frame is disposed on one side of the turning frames, the three-axis moving assembly is mounted on the aluminum spraying frame, and the spray gun is mounted on the three-axis moving assembly through the angle adjustment assembly.

8. The digital and informationized fully-automatic aluminum thermal-spraying production line according to claim 7, wherein an arc-shaped rack is disposed on the arc-shaped slider, and the arc-shaped rack is connected to a drive gear and is driven by the drive gear to move to drive the arc-shaped slider to move along the arc-shaped sliding rail.

9. The digital and informationized fully-automatic aluminum thermal-spraying production line according to claim 1, wherein each of the rolling mechanisms comprises a rolling pedestal, a rolling frame, at least two first rolling wheels, a rolling drive mechanism, a rolling wheel carrier and a second rolling wheel, wherein the at least two first rolling wheels are rotatably disposed on the rolling pedestal and are spaced from each other, the rolling frame is disposed on the rolling pedestal, the rolling drive mechanism is disposed on the rolling frame, the rolling wheel carrier is mounted on the rolling drive mechanism, the second rolling wheel is rotatably mounted on the rolling wheel carrier, and the rolling drive mechanism is configured to drive the second rolling wheel to move upwards and downwards.

10. The digital and informationized fully-automatic aluminum thermal-spraying production line according to claim 9, wherein the workpieces are angle steel, and each of the at least two first rolling wheels comprises a first rolling part and a second rolling part, wherein the first rolling part and the second rolling part are conical, and a first angle matched with the angle steel is formed between the first rolling part and the second rolling part; and the second rolling wheel comprises a third rolling part and a fourth rolling part, wherein the third rolling part and the fourth rolling part are conical, and a second angle matched with the angle steel is formed between the third rolling part and the fourth rolling part.

* * * * *